US008666188B2

(12) United States Patent
Schweid et al.

(10) Patent No.: US 8,666,188 B2
(45) Date of Patent: Mar. 4, 2014

(54) IDENTIFYING EDGES OF WEB MEDIA USING TEXTURAL CONTRAST BETWEEN WEB MEDIA AND BACKER ROLL

(75) Inventors: Stuart Schweid, Pittsford, NY (US); Howard A. Mizes, Pittsford, NY (US)

(73) Assignee: Xerox Corporation, Norwalk, CT (US)

(*) Notice: Subject to any disclaimer, the term of this patent is extended or adjusted under 35 U.S.C. 154(b) by 370 days.

(21) Appl. No.: 13/070,132

(22) Filed: Mar. 23, 2011

(65) Prior Publication Data

US 2012/0243928 A1 Sep. 27, 2012

(51) Int. Cl.
*G06K 9/48* (2006.01)
*G06K 9/76* (2006.01)
*G06K 9/40* (2006.01)

(52) U.S. Cl.
USPC ............................ 382/260; 382/199; 382/210

(58) Field of Classification Search
None
See application file for complete search history.

(56) References Cited

U.S. PATENT DOCUMENTS 3,515,488 A * 6/1970 Houser ........................ 356/431
4,146,797 A * 3/1979 Nakagawa .................... 250/548
4,260,899 A * 4/1981 Baker ...................... 250/559.49
4,314,159 A * 2/1982 Davis ...................... 250/559.36
4,845,374 A * 7/1989 White et al. ............... 250/559.4
5,033,096 A * 7/1991 Morrison et al. ............. 382/152
5,220,177 A * 6/1993 Harris .......................... 250/548
5,448,266 A * 9/1995 Jamzadeh ..................... 347/225
5,489,784 A * 2/1996 Koiranen et al. ............. 250/548
5,724,259 A * 3/1998 Seymour et al. .............. 382/199
5,903,712 A * 5/1999 Wang et al. .................... 358/1.9
6,009,808 A * 1/2000 Loffler .......................... 101/211
6,058,201 A * 5/2000 Sikes et al. .................... 382/112
6,101,945 A * 8/2000 Hara et al. .................... 101/486
6,175,419 B1 * 1/2001 Haque et al. .................. 356/429
6,348,696 B1 * 2/2002 Alt et al. .................. 250/559.36
7,279,695 B2 * 10/2007 Oguri ...................... 250/559.36
7,828,423 B2 11/2010 Larson et al.
7,837,290 B2 11/2010 Mizes et al.
2003/0116725 A1 * 6/2003 Sorebo et al. ........... 250/559.36
2004/0231543 A1 * 11/2004 Smythies et al. ............ 101/486
2005/0190368 A1 * 9/2005 Ehrhardt et al. ............. 356/431
2006/0132787 A1 * 6/2006 Mestha et al. ................ 356/454
2009/0022391 A1 * 1/2009 Huotilainen .................. 382/141
2009/0028416 A1 * 1/2009 Floeder et al. ................ 382/141
2009/0028417 A1 * 1/2009 Floeder et al. ................ 382/141
2010/0260378 A1 * 10/2010 Noy et al. ..................... 382/103
2011/0050879 A1 * 3/2011 Shyy .............................. 348/88

* cited by examiner

*Primary Examiner* — Stephen R Koziol
*Assistant Examiner* — Jonathan S Lee
(74) *Attorney, Agent, or Firm* — Pillsbury Winthrop Shaw Pittman, LLP

(57) ABSTRACT

A computer-implemented method for identifying the edges of web media transported on a movable transport surface includes sensing, using a linear array sensor positioned along a process path of a web, the web media and the movable transport surface to obtain image data representative of variations in optical textural properties of the web media and variations in optical textural properties of the movable transport surface, wherein the variations in the optical textural properties of the movable transport surface are different from the variations in the optical textural properties of the web media; and processing the image data to determine differences between the variations in the optical textural properties of the web media and the variations in the optical textural properties of the movable transport surface to identify an edge of the web media.

30 Claims, 6 Drawing Sheets

IDENTIFYING EDGES OF WEB MEDIA USING TEXTURAL CONTRAST BETWEEN WEB MEDIA AND BACKER ROLL

BACKGROUND

1. Field

The present disclosure relates to a method and a system for identifying the edges of web media transported on a movable transport surface.

2. Description of Related Art

A full width array sensor is used for monitoring or controlling several sub-systems in different image printing systems. For example, the full width array sensor is used for uniformity correction as well as jet forming and registration. In many of these image printing systems, the sensor is calibrated at regular intervals to ensure a uniform response. The full width array sensors are calibrated by measuring the response of each sensor element in the absence of light and the response of each sensor element to a uniform exposure. The latter measurement is typically made using a white calibration strip that is known to have a uniform reflectivity across its surface. From the calibration, the relative light measured by each sensor element in the full width array sensor can be determined independent of the sensor's offset (i.e., dark level response of each sensor element) and gain (i.e., sensitivity of the sensor element to light).

In a continuous feed direct marking printer, the standard approach to the full width array sensor calibration is difficult. The full width array sensor is fixed in place where the sensor views the web media as the web media passes under the sensor. Creating an architecture where the full width array sensor moves to measure a calibration strip is generally not preferred. Therefore, the blank media itself is generally used as the calibration strip.

The web media passes over a roller which ensures that the spacing between the web media and the full width array sensor remains fixed and thus the image remains in focus. The web media is illuminated by a light source and the reflected light is measured by the full width array sensor. For thin web media, some portion of the light passes through the web media and is reflected by the roller. The amount of light passing through the web media depends on the local thickness of the web media. To ensure that variations in the local thickness of the web media do not add noise to a measurement of the uniformity, a white backer roller is generally used.

In general, the reflectance of the backer roll may differ slightly from the reflectance of the web media. However, the calibration of the sensor eliminates the ability to monitor this difference. For paper edge detection, the full width array sensor is generally wider than the web media. Some sensors monitor/view the web media and other sensors monitor/view the roller. The calibration process forces the full width array sensors that monitor/view the roller to have an equal response to those sensors that monitor/view the web media, providing no contrast across the transition from the web media to the roller. This means that the reflectivity difference between the backer roll and the paper may not be used to discriminate between the backer roll and the paper.

The present disclosure provides improvements over the prior art.

SUMMARY

According to one aspect of the present disclosure, a method for identifying the edges of web media transported on a movable transport surface is provided. The method is implemented in a computer system comprising one or more processors configured to execute one or more computer program modules. The method includes sensing, using a linear array sensor positioned along a process path of a web, the web media and the movable transport surface to obtain image data representative of variations in optical textural properties of the web media and variations in optical textural properties of the movable transport surface, wherein the variations in the optical textural properties of the movable transport surface are different from the variations in the optical textural properties of the web media; and processing the image data to determine differences between the variations in the optical textural properties of the web media and the variations in the optical textural properties of the movable transport surface to identify an edge of the web media.

According to another aspect of the present disclosure, a system for identifying the edges of web media transported on a movable transport surface is provided. The system includes a linear array sensor and a processor. The linear array sensor, positioned along a process path of a web, configured to sense the web media and the movable transport surface to obtain image data representative of variations in optical textural properties of the web media and variations in optical textural properties of the movable transport surface. The variations in the optical textural properties of the movable transport surface are different from the variations in the optical textural properties of the web media. The processor is configured to process the image data to determine differences between the variations in the optical textural properties of the web media and the variations in the optical textural properties of the movable transport surface to identify an edge of the web media.

Other objects, features, and advantages of one or more embodiments of the present disclosure will seem apparent from the following detailed description, and accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

Figure 1:
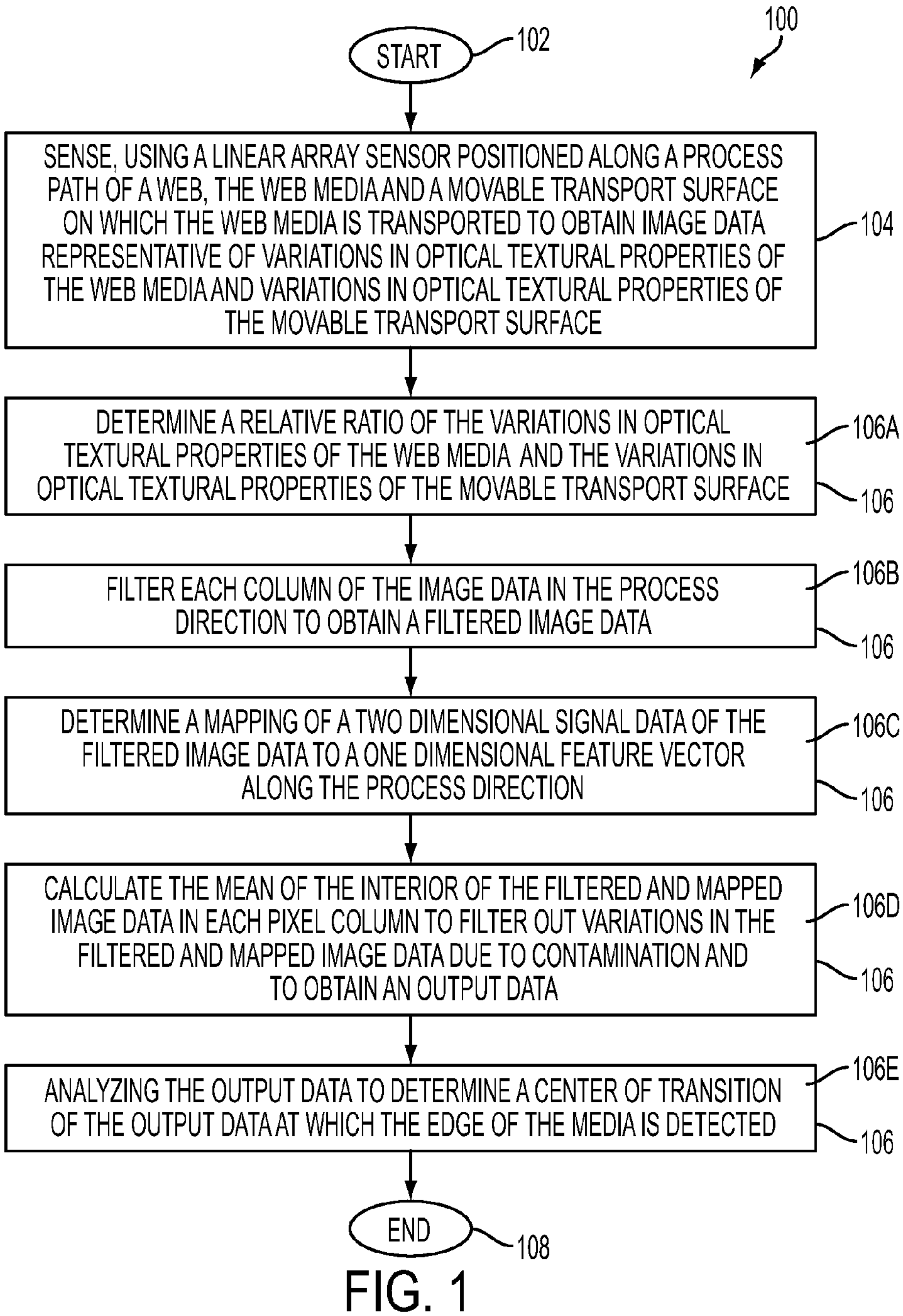
FIG. 1 illustrates a method for identifying the edges of web media in accordance with an embodiment of the present disclosure.

The present disclosure proposes a method and a system to detect paper edges, for example, in a continuous feed direct marking printer having an in-line full-width array detection system. In general, in a continuous feed direct marking printer (e.g., based on solid inkjet technology), multiple printheads are distributed over a long print zone to obtain the desired print width and image resolutions.

The present disclosure relies on differences in variation within pixel column measurement due to the different textures of backer roll and paper. Texture here refers to spatial variations in optical reflectance of the backer roll and the paper. For example, paper or media is fibrous and therefore has substantial texture while the backer roll is smooth and therefore has little or no texture. The variation in textures of the backer roll and the paper is used in the present disclosure to detect the edges of the paper.

The method includes three procedures. First, each column of data is band-pass filtered, where the column runs in a process direction of the image printing system. Because the paper and the backer roll have different optical textures, the noise frequency between the paper and the backer roll is different. Second, for each column of filtered data, the mean of the interior of the data is calculated. In order to eliminate outliers (i.e., spikes due to ink or toner on the backer roll), the mean may exclude the lowest 20% and highest 20% of data set. Finally, an edge detection algorithm is applied to the filtered column data within the determined range (obtained from the second procedure) to detect paper edges.

The present disclosure proposes band-pass filtering and outlier rejection to perform the textural analysis. However, it is contemplated that the present disclosure may use any other textural analysis algorithms to detect the edges of the paper. Some other examples of textural analysis algorithms include sampling the moments in the vicinity of each pixel, the use of a gray level co-occurrence matrix, and extracting metrics from the local frequency content.

As noted above in the background section of the present disclosure, in many image printing systems, the sensor is calibrated at regular intervals for a uniform response. Such calibration is done using blank paper. This calibration procedure makes it difficult to use the existing sensor for paper edge detection (i.e., finding where the edge of the paper and the backer roll is located).

Even if a mean (i.e. an average) reflectance difference between the backer roll and the paper exists, this reflectance difference signal is removed during the sensor calibration, in which the gain and offset of each pixel is adjusted to give a uniform response across the transition between the backer roll and the paper. Therefore, after the sensor calibration, no average level gray difference signal remains. This is because the calibration procedure sets the gray level of the measured backing roll to a fixed value. After calibration, the average gray response of the sensor when placed over the paper is the same as that of the same sensor when placed over the backer roll. This means that the reflectivity difference (between the backer roll and the paper) cannot be used to discriminate between the backer roll and the paper.

Another signal is to be selected to distinguish the backer roll from the paper. Clearly, for reasons described previously, average or mean reflectance signal is incapable. One alternative is the standard deviation. However, the standard deviation presents a problem for two reasons.

Figure 3:
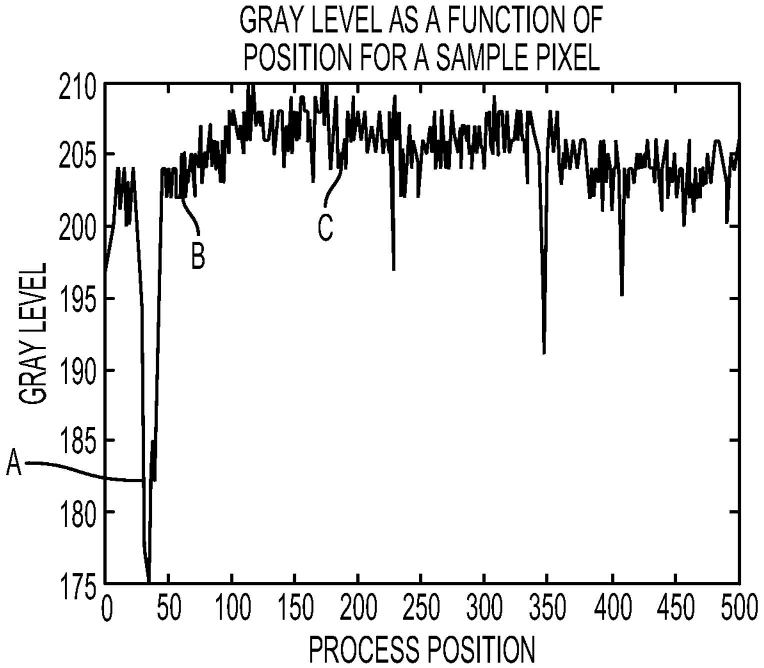
FIG. 3 illustrates a response over time of a single pixel of a linear array sensor sensing the surface of a backer roll in accordance with an embodiment of the present disclosure.

First, there may be significant dirt, such as ink residue, etc., present on the backer roll that strongly corrupts the standard deviation measurement. FIG. 3 shows a response over time of a single pixel of a linear array sensor (e.g., a full-width array bar) sensing a portion of the backer roll not covered by the web media. The graph shown in FIG. 3 shows gray level (i.e., the brightness value assigned to the pixel of interest) of the sensor as a function of position (in a process direction) of the sample pixel. The graph in FIG. 3 illustrates gray level of the sensor, expressed in a set of discrete gray levels (e.g., 0-255), on a vertical y-axis. On a horizontal x-axis, the graph in FIG. 3 illustrates the process position, expressed in terms of the scanline index. The scanline index is proportional to the ratio of the speed of the web media to the line scan rate of the full width array sensor. A large drop A (early in the capture) due to a spurious ink drop on the backer roll is clearly shown in FIG. 3.

Second, even if the outliers (i.e., spikes due to ink or toner on the backer roll) are removed, the standard deviation may not provide an optimal signal for distinguishing between the paper and the backer roll. This is because the backer roll has higher low frequency content while the paper has higher mid-high frequency content. Combining both the low frequency content and the high frequency content into a single standard deviation statistic reduces the ability tell the two apart. The standard deviation of both can be large, but for different reasons.

Figure 4:
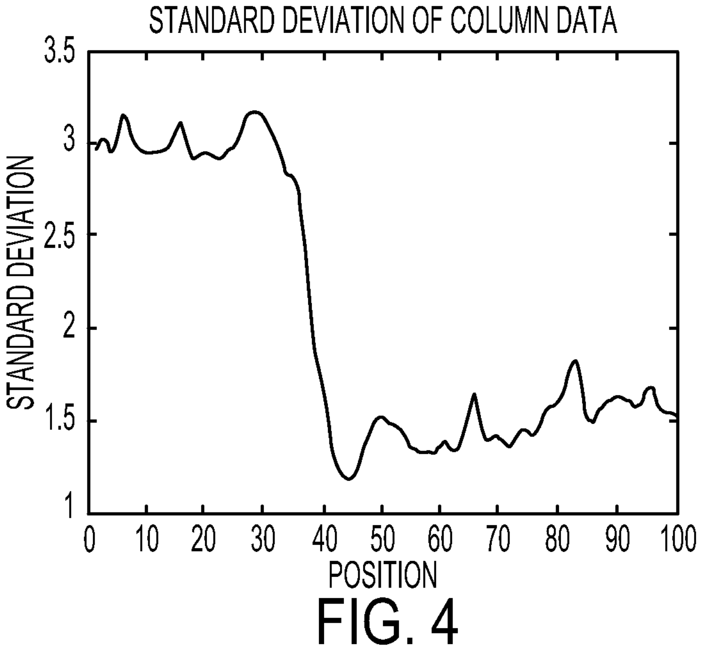
FIG. 4 illustrates standard deviation of a set of column data, one of which is illustrated in FIG. 3 (after outliers are removed) in accordance with an embodiment of the present disclosure.

FIG. 4 illustrates a signal using the standard deviation of column data (in FIG. 3) after the outliers are removed. The graph of FIG. 4 shows the standard deviation of column data as a function of position (in the cross process direction) for each pixel column in the vicinity of the edge. The graph in FIG. 4 illustrates the standard deviation of the column data in FIG. 3 (with the outliers are removed) on a vertical y-axis. On a horizontal x-axis, the graph in FIG. 4 illustrates the pixel column index. The pixel column index multiplied by the pixel to pixel spacing in the full width array gives the pixel position in spatial units. As will be clear from the discussions later, the signal in FIG. 4 has smaller signal strength in comparison with a signal (e.g., FIG. 8) obtained (e.g., when a band-pass filter is used) in accordance with an embodiment of the present disclosure.

Instead of weighting all frequencies equally, which the standard deviation does (except the mean), the frequency space may be weighed to emphasize differences between the backer roll variation and the paper variation. By band-pass filtering each column of the captured image data (i.e., filtering in the process direction) such a desired frequency range may be isolated.

A method 100 for identifying the edges of web media in accordance with the present disclosure is shown in FIG. 1. The method 100 is implemented in a computer system comprising one or more processors 220 (as shown in and explained with respect to FIG. 2) configured to execute one or more computer program modules.

The method 100 begins at procedure 102. At procedure 104, a linear array sensor 222 (as shown in and explained with respect to FIG. 2) positioned along a process path of a web is configured to sense the web media 224 and a movable transport surface (e.g., backer roll) 225 on which the web media 224 is transported to obtain image data. The image data is representative of variations in optical textural properties of the web media 224 and variations in optical textural properties of the movable transport surface 225. The variations in the optical textural properties of the movable transport surface 225 are different from the variations in the optical textural properties of the web media 224. The movable transport surface 225 may be a backer roll 225.

At procedure 106, the processor 220 is configured to process the image data to determine differences between the variations in the optical textural properties of the web media 224 and the variations in the optical textural properties of the movable transport surface 225 to identify an edge of the web media 224. The processing procedure 106 is performed in a process direction along which the web media 224, onto which an image is transferred and developed (or printed), moves through an image transfer and developing apparatus. The cross-process direction, along the same plane as the web, is substantially perpendicular to the process direction.

The processing procedure 106 further includes procedures 106A-106E. At procedure 106A, a relative ratio of the spatial frequency of the variations in optical textural properties of the web media 224 and the variations in optical textural properties of the movable transport surface 225 is determined. This determined relative ratio is used to identify a desired frequency range. The desired frequency range here refers to a frequency range or space that emphasizes differences between the variations in optical textural properties of the web media and the variations in optical textural properties of the movable transport surface.

Figure 5:
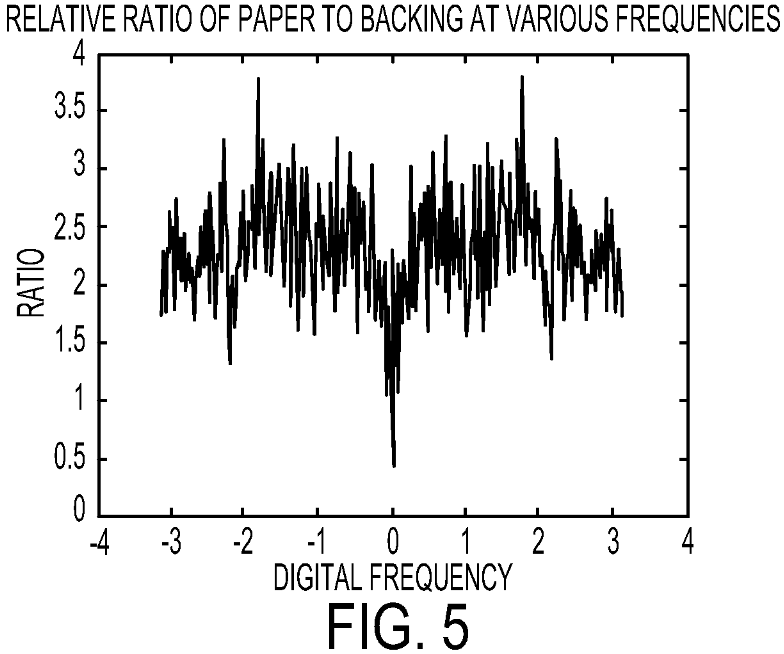
FIG. 5 illustrates relative ratio of web media variation to the backer roll variation at various frequencies in accordance with an embodiment of the present disclosure.

The graph shown in FIG. 5 plots the ratio of the frequency spectrum of the profile of the web media in the process direction to the frequency spectrum of the profile of the backer roll in the process direction for a single pixel column. As can be seen from FIG. 5, the ratio is generally frequency dependent and the ratio is larger in the mid frequencies. This aspect (i.e., the ratio being larger in the mid frequencies) guides the design of a band-pass filter that is applied in step 106B.

The graph in FIG. 5 illustrates the relative ratios of the variations in optical textural properties of the web media and the variations in optical textural properties of the movable transport surface on a vertical y-axis. On a horizontal x-axis, the graph in FIG. 5 illustrates digital frequency, expressed in cycles/mm.

As shown in FIG. 5, the desired frequency range is a middle frequency band and the relative ratio is high in the desired frequency range in comparison with other frequency ranges. That is, this desired frequency range, which contains the middle frequency band, provides the largest signal difference between the movable transport surface and the web media. The relative ratio in the desired frequency range is a largest difference between the variations in the optical textural properties of the media and the variations in the optical textural properties of the backer roll in the desired frequency range.

As shown in FIG. 5, the lower frequencies have ratios (paper to backer roll strength) that are much lower than the mid frequency ratios. The same is true for the higher frequencies. That is, the higher frequencies have ratios (paper to backer roll strength) that are slightly lower than the mid frequency ratios. The band-pass filter removes the lower frequencies as well as the higher frequencies to focus on the region with the largest expected differences between the movable transport surface and the web media.

Next at procedure 106B, each pixel column of the image data is filtered (in the process direction) to obtain a filtered image data. Filtered image data generally refers to image data in the desired frequency range. The filtering may be performed using a band-pass filter. As is known by one skilled in the art, a band-pass filter is configured to allow (or pass) frequencies within a certain range and to reject frequencies outside that range.

The present disclosure uses a band-pass filter to emphasize variations in the paper (e.g., present from fiber variation) versus variations in the backer roll. The band-pass filter is applied in the process direction. The backer roll has much lower signal strength at the filtered mid-frequencies than the paper. Low frequencies are present in both the backer roll and the paper as the backer roll has splotches and slow variation. The pixel column profile of the backer roll (as shown FIG. 3) shows large excursions A. The profile also shows a slow drift in the response (varying from approximately 204 gray levels at B to 208 gray levels at C). These artifacts A and the transition from B to C introduce high and low frequency components respectively. Smaller artifacts are introduced in the mid frequencies. The band-pass filter removes this source of variation so that the distinguishing mid frequencies provide an even stronger signal.

Figure 6:
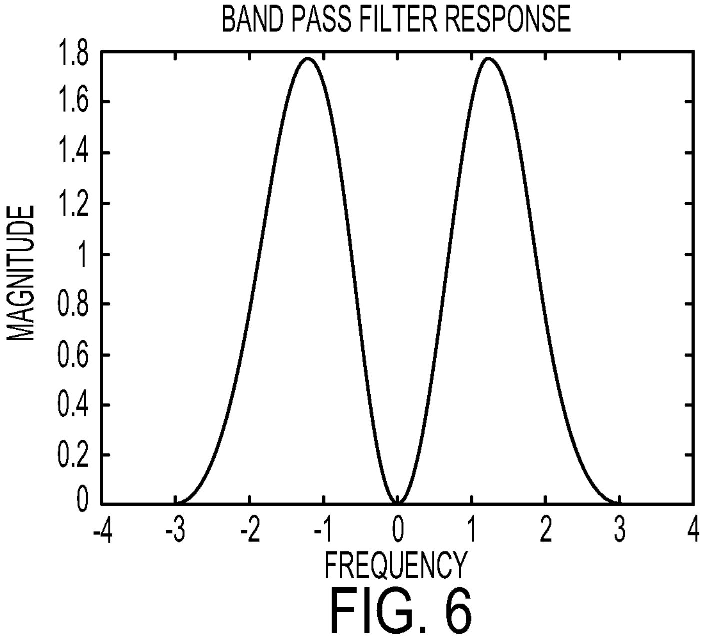
FIG. 6 illustrates a frequency response of an exemplary band-pass filter that may be applied to the captured image that extracts the frequencies with the largest relative ratios in accordance with an embodiment of the present disclosure.

FIG. 6 shows a frequency response of an exemplary band-pass filter. Such band-pass filter may be applied to the captured image (e.g., data shown in FIG. 5) to isolate the frequencies with the largest relative ratios (between the paper and the backer roll). The graph in FIG. 6 illustrates output gain or magnitude of the band-pass filter on a vertical y-axis. On a horizontal x-axis, the graph in FIG. 6 illustrates frequency, expressed in cycles/mm.

After filtering the captured image, a mapping is determined to convert the two dimensional filtered image into a one dimensional measure for each location. At procedure 106C, a mapping of a two dimensional signal data of the filtered image data to a one dimensional feature vector along the process direction is determined.

At procedure 106D, the mean of the interior of the filtered data in each pixel column is calculated to filter out signal variations in the filtered data due to contamination on the movable transport surface and to obtain an output data. That is, the mean of the filtered data is calculated by excluding a percentage of data points from the beginning and end of the filtered data set. The mean of the interior of the filtered data in each pixel column excludes certain (outlying) data from the analysis.

For example, in one embodiment, the mean of the interior of the filtered data in each pixel column is calculated by excluding a lower 20% of the filtered data and an upper 20% of the filtered data. In another embodiment, the mean of the interior of the filtered data in each pixel column is calculated by excluding a lower 25% of the filtered data and an upper 25% of the filtered data.

Using the mean of the interior of the filtered data as a replacement for standard deviation drastically reduces the sensitivity to outliers. For example, ink contamination on the paper or ink on the backer roll does not significantly affect the results.

Figure 7:
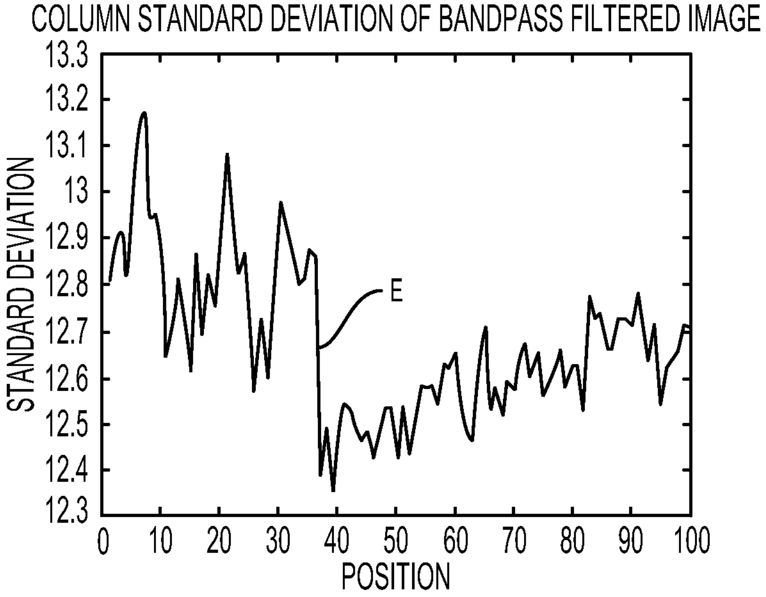
FIG. 7 illustrates standard deviation of every column of band-pass filtered image data in an area having pixels in both the backer roll and the web media.
Figure 8:
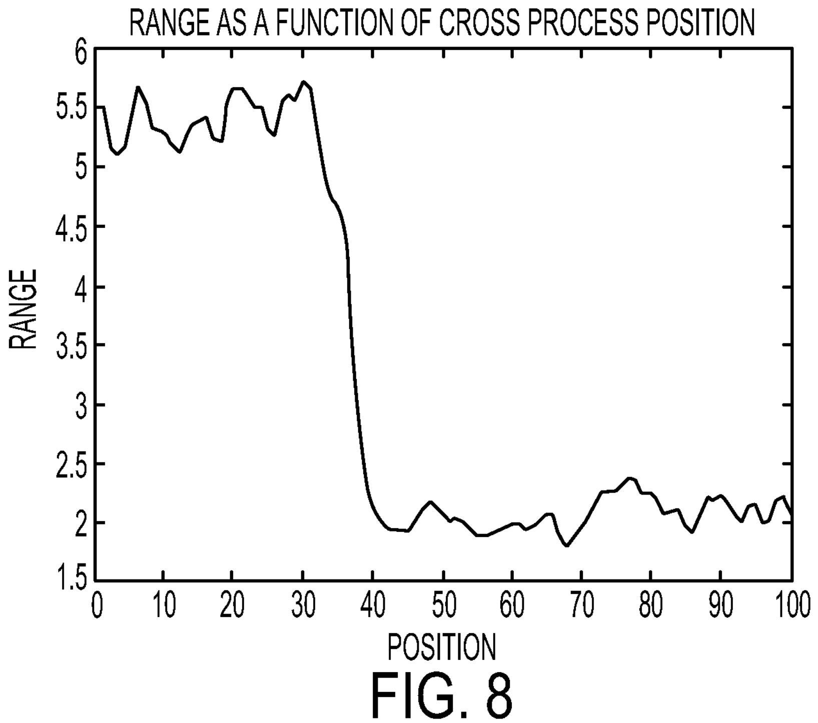
FIG. 8 illustrates a 20-80% range for the data shown in FIG. 7 in accordance with an embodiment of the present disclosure.

FIG. 7 is a graph showing the output data obtained by applying the standard deviation. FIG. 8 is a graph showing the output data obtained by applying a signal range difference (e.g., 20-80% range) to the filtered data in accordance with an embodiment of the present application. A comparison between the signals in graphs of FIGS. 7 and 8 clearly indicate that the signal (FIG. 8) obtained by applying a signal range difference is much cleaner than the signal (FIG. 7) obtained by using the standard deviation.

Next at procedure 106E, the output data is analyzed to determine a center of transition of the output data at which the edge of the media is detected. The center of transition is a transition point between the two groups of data, that is, the web media and the movable transport surface. For example, a match filter may be used to find the center of the transition.

A comparison between the signals in graphs of FIGS. 4 and 8 clearly indicate that larger signal strength (FIG. 8) is obtained when the band-pass filter is used. When the band-pass filter is used, a ratio in the order of approximately 2.5 times the signal is obtained. In contrast, when the band-pass filter is not used (i.e., the data is directly used without a filter), a ratio in the order of less than 2 times the signal is obtained. The method 100 ends at procedure 108.

Figure 2:
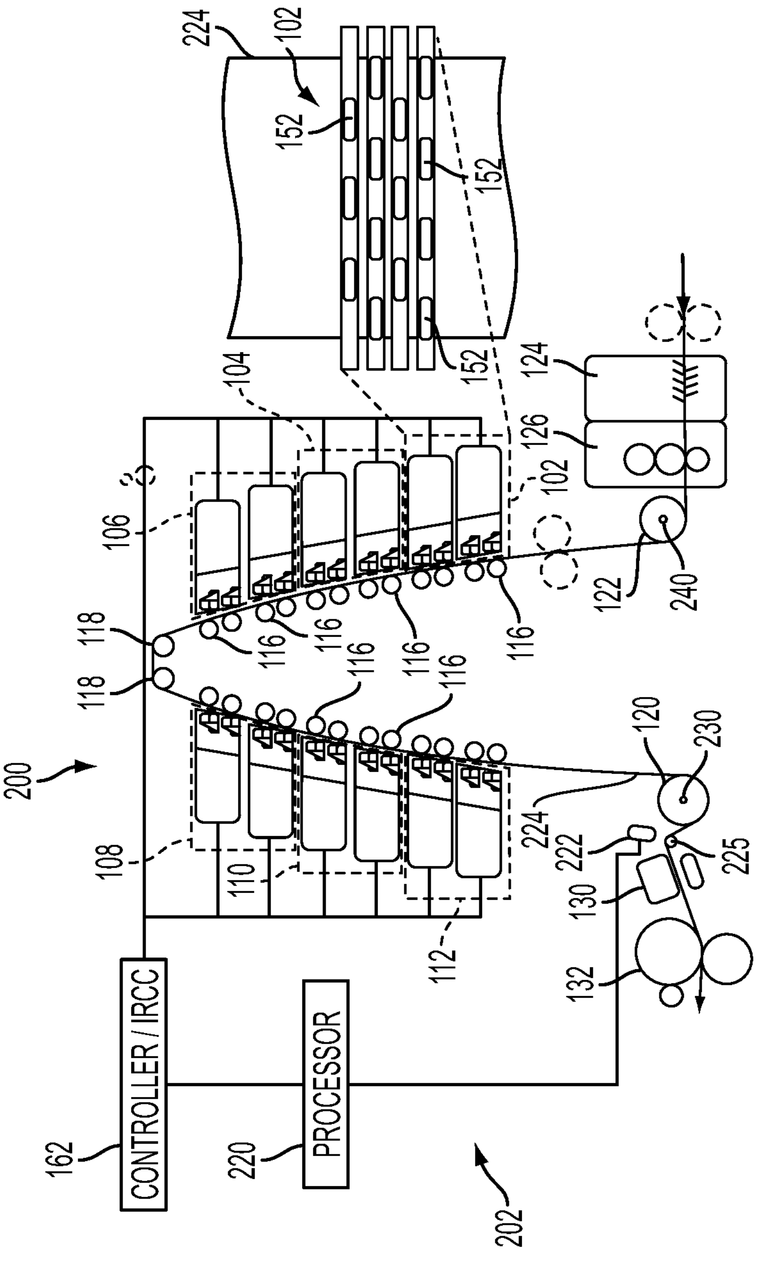
FIG. 2 illustrates a schematic view of a continuous web printing system having a system for identifying the edges of the web media in accordance with an embodiment of the present disclosure.

FIG. 2 illustrates a schematic view of a continuous web printing system 200 having a system 202 for identifying the edges of web media in accordance with an embodiment of the present disclosure. The system 202 includes the linear array sensor 222 and the processor 220.

As shown in FIG. 2, the linear array sensor 222 is positioned along the process path (as shown in FIG. 2) of the web 224. The linear array sensor 222 is configured to sense the web media 224 and the movable transport surface 225 on which the web media 224 is transported to obtain image data representative of variations in optical textural properties of the web media 224 and variations in optical textural properties of the movable transport surface 225. The variations in the optical textural properties of the movable transport surface 225 are different from the variations in the optical textural properties of the web media 224. The linear array sensor 128 may be a full width array bar.

The processor 220 is configured to process the image data to determine differences between the variations in the optical textural properties of the web media 224 and the variations in the optical textural properties of the movable transport surface 225 to identify an edge of the web media 224. In one embodiment, the processor 220 can comprise either one or a plurality of processors therein. Thus, the term "processor" as used herein broadly refers to a single processor or multiple processors. In one embodiment, the processor 220 can be a part of or forming a computer system.

The processor 220 is configured to process the image data in a process direction along which the web, onto which an image is transferred and developed, moves through an image transfer and developing apparatus. The movable transport surface may be a roller.

First, the processor 220 is configured to determine a relative ratio of the spatial frequency of the variations in optical textural properties of the web media and the variations in optical textural properties of the movable transport surface to identify a desired frequency range. The processor 220 is then configured to filter, using a band-pass filter, each column of the image data in a process direction to obtain a filtered image data in the desired frequency range. The desired frequency range is generally a middle frequency range. The relative ratio in the desired frequency range is high compared with other frequency ranges. The relative ratio in the desired frequency range includes the largest difference between the variations in the optical textural properties of the media and the variations in the optical textural properties of the backer roll in the desired frequency range.

The processor 220 is then configured to determine a mapping of a two dimensional signal data of the filtered image data to a one dimensional feature vector along the process direction. The one dimensional feature vector corresponds to a pixel position in a cross-process direction. The processor 220 is then configured to calculate a mean of the interior of the mapped (and filtered) data to filter out signal variations in the mapped (and filtered) data due to possible contamination on the movable transport surface to obtain an output data. The percentage range may be a 25-75% range or a 20-80% range. The processor 220 is then configured to analyze the output data to determine a center of transition of the output data at which the edge of the web media is detected.

As shown in FIG. 2, the continuous web printing system 200 also includes a print engine and a controller 162. The print engine of the continuous web printing system 200 includes a series of print (or color) modules 102, 104, 106, 108, 110, and 112, each print module 102, 104, 106, 108, 110, and 112 effectively extending across the width of the web 224 in the cross-process direction. As shown in FIG. 2, the print modules 102, 104, 106, 108, 110, and 112 are positioned sequentially along the in-track axis of a process path defined in part by rolls 116. The process path is further defined by upper rolls 118, leveler roll 120 and pre-heater roll 122. A brush cleaner 124 and a contact roll 126 are located at one end of the process path. A heater 130 and a spreader 132 are located at the opposite end of the process path.

Each print module 102, 104, 106, 108, 110, and 112 is configured to provide an ink of a different color. Six print modules are shown in FIG. 2 although more or fewer print modules may be used. In all other respects, the print modules 102, 104, 106, 108, 110, and 112 are substantially identical. Structure and operation of such print modules are explained in detail in U.S. Pat. No. 7,828,423 titled "Ink jet printer using phase change ink printing on a continuous web," which herein is incorporated by reference in its entirety.

The continuous web printing system 200 also includes is a controller (Integrated Registration and Color Control (IRCC)) 162 and a memory. The controller 162 is configured to adjust process (y) and cross-process (x) direction distances between printheads based on the information received from the processor 220 (i.e., signal processing and control algorithms, and actuator electronics to determine process (y) and cross-process (x) direction distances between printheads). The IRCC board or controller 162 is further connected to each of printheads 152 to control jetting of the nozzles, and a head position board. Operation of such controller (Integrated Registration and Color Control (IRCC)) is explained in detail in U.S. Pat. No. 7,837,290 titled "Continuous web printing system alignment method," which herein is incorporated by reference in its entirety.

Thus, the present disclosure provides a method and a system for edge detection of web media without adding any additional sensors. The present disclosure provides a simple and robust method for detecting paper edge on a captured scan. The method of the present disclosure may be implemented in-situ.

In embodiments of the present disclosure, the processor, for example, may be made in hardware, firmware, software, or various combinations thereof. The present disclosure may also be implemented as instructions stored on a machine-readable medium, which may be read and executed using one or more processors. In one embodiment, the machine-readable medium may include various mechanisms for storing and/or transmitting information in a form that may be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and embodiments performing certain actions, it will be apparent that such descriptions are merely for the sake of convenience and that such actions in fact result from computing devices, processing devices, processors, controllers, or other devices or machines executing the firmware, software, routines, or instructions.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A computer-implemented method for identifying edges of web media transported on a movable transport surface, wherein the method is implemented in a computer system comprising one or more processors configured to execute one or more computer program modules, the method comprising:

sensing, using a linear array sensor positioned along a process path of a web, the web media and the movable transport surface to obtain image data representative of variations in optical textural properties of the web media and variations in optical textural properties of the movable transport surface, wherein the variations in the optical textural properties of the movable transport surface are different from the variations in the optical textural properties of the web media; and processing the image data to determine differences between the variations in the optical textural properties of the web media and the variations in the optical textural properties of the movable transport surface to identify an edge of the web media, wherein the linear array sensor is a full-width linear array sensor that is configured to sense the web media and the movable transport surface on which the web media is transported to obtain the image data.

2. The method according to claim 1, wherein the processing is performed in a process direction along which the web, onto which an image is printed, moves through an image transfer and developing apparatus.

3. The method according to claim 1, wherein the movable transport surface is a roller.

4. A computer-implemented method for identifying edges of web media transported on a movable transport surface, wherein the method is implemented in a computer system comprising one or more processors configured to execute one or more computer program modules, the method comprising:

sensing, using a linear array sensor positioned along a process path of a web, the web media and the movable transport surface to obtain image data representative of variations in optical textural properties of the web media and variations in optical textural properties of the movable transport surface, wherein the variations in the optical textural properties of the movable transport surface are different from the variations in the optical textural properties of the web media; and processing the image data to determine differences between the variations in the optical textural properties of the web media and the variations in the optical textural properties of the movable transport surface to identify an edge of the web media, wherein the processing further comprises determining a relative ratio of the spatial frequency of the variations in optical textural properties of the web media and the variations in optical textural properties of the movable transport surface to identify a desired frequency range.

5. The method according to claim 4, wherein the processing further comprises filtering each column of the image data in a process direction to obtain a filtered image data in the desired frequency range.

6. The method according to claim 5, wherein the filtering is performed using a band-pass filter.

7. The method according to claim 4, wherein the desired frequency range is a middle frequency range.

8. The method according to claim 4, wherein the relative ratio in the desired frequency range is high compared with other frequency ranges.

9. The method according to claim 4, wherein the relative ratio in the desired frequency range includes a largest difference between the variations in the optical textural properties of the media and the variations in the optical textural properties of the backer roll.

10. The method according to claim 5, wherein the processing further comprises mapping a two dimensional signal data of the filtered image data into a one dimensional feature vector along a cross-process direction.

11. The method according to claim 10, wherein the one dimensional feature vector corresponds to a pixel position in the cross-process direction.

12. The method according to claim 10, wherein the processing further comprises calculating the mean of the interior for the mapped data to filter out signal variations in the mapped data due to contamination on the movable transport surface and to obtain an output data.

13. The method according to claim 12, wherein the mean of the interior for the mapped data is calculated by excluding a lower 20% of the mapped data and an upper 20% of the mapped data.

14. The method according to claim 12, further comprising analyzing the output data to determine a center of transition of the output data at which the edge of the web media is detected.

15. A system for identifying edges of web media transported on a movable transport surface, the system comprising:

a linear array sensor, positioned along a process path of a web, configured to sense the web media and the movable transport surface to obtain image data representative of variations in optical textural properties of the web media and variations in optical textural properties of the movable transport surface, wherein the variations in the optical textural properties of the movable transport surface are different from the variations in the optical textural properties of the web media; and a processor configured to process the image data to determine differences between the variations in the optical textural properties of the web media and the variations in the optical textural properties of the movable transport surface to identify an edge of the web media, wherein the linear array sensor is a full-width linear array sensor that is configured to sense the web media and the movable transport surface on which the web media is transported to obtain the image data.

16. The system according to claim 15, wherein the processor is configured to process the image data in a process direction along which the web, onto which an image is printed, moves through an image transfer and developing apparatus.

17. The system according to claim 15, wherein the movable transport surface is a roller.

18. A system for identifying edges of web media transported on a movable transport surface, the system comprising:

a linear array sensor, positioned along a process path of a web, configured to sense the web media and the movable transport surface to obtain image data representative of variations in optical textural properties of the web media and variations in optical textural properties of the movable transport surface, wherein the variations in the optical textural properties of the movable transport surface are different from the variations in the optical textural properties of the web media; and a processor configured to process the image data to determine differences between the variations in the optical textural properties of the web media and the variations in the optical textural properties of the movable transport surface to identify an edge of the web media, wherein the processor configured to determine a relative ratio of the spatial frequency of the variations in optical textural properties of the web media and the variations in optical textural properties of the movable transport surface to identify a desired frequency range.

19. The system according to claim 18, wherein the processor configured to filter, using a band-pass filter, each column of the image data in a process direction to obtain a filtered image data in the desired frequency range.

20. The system according to claim 18, wherein the desired frequency range is a middle frequency range.

21. The system according to claim 18, wherein the relative ratio in the desired frequency range is high compared with other frequency ranges.

22. The system according to claim 18, wherein the relative ratio in the desired frequency range includes a largest difference between the variations in the optical textural properties of the media and the variations in the optical textural properties of the backer roll in the desired frequency range.

23. The system according to claim 19, wherein the processor configured to determine a mapping of a two dimensional signal data of the filtered image data to a one dimensional feature vector along a cross-process direction.

24. The system according to claim 23, wherein the one dimensional feature vector corresponds to a pixel position in the cross-process direction.

25. The system according to claim 23, wherein the processor configured to calculate the mean of the interior of the mapped data to filter out signal variations in the mapped data due to contamination on the movable transport surface and to obtain an output data.

26. The system according to claim 25, wherein the mean of the interior of the mapped data is calculated by excluding a lower 20% of the mapped data and an upper 20% of the mapped data.

27. The system according to claim 25, wherein the processor configured to analyze the output data to determine a center of transition of the output data at which the edge of the web media is detected.

28. The method according to claim 1, wherein the full-width linear array sensor is constructed and arranged to extend in a cross-process direction and to be wider than the web media.

29. The method according to claim 1, wherein the full-width linear array sensor is fixedly positioned along the process path of the web media so as to sense the web media as the web media passes under the full-width linear array sensor.

30. The method according to claim 1, wherein the variations in the optical textural properties of the movable transport surface include spatial variations in optical reflectance properties of the movable transport surface and the variations in the optical textural properties of the web media include spatial variations in optical reflectance properties of the web media.

* * * * *